(12) United States Patent
Blanchon

(10) Patent No.: US 6,800,686 B2
(45) Date of Patent: Oct. 5, 2004

(54) PART MADE OF REINFORCED PLASTICS MATERIAL, AND METHOD OF MANUFACTURE

(75) Inventor: Charles-Guillaume Blanchon, Oyonnax (FR)

(73) Assignee: Compagnie Plastic Omnium, Lyons (FR)

( * ) Notice: Subject to any disclaimer, the term of this patent is extended or adjusted under 35 U.S.C. 154(b) by 439 days.

(21) Appl. No.: 09/811,619

(22) Filed: Mar. 20, 2001

(65) Prior Publication Data

US 2001/0028128 A1 Oct. 11, 2001

(51) Int. Cl.⁷ .................................................. C08K 3/40
(52) U.S. Cl. ....................... 524/494; 264/241; 264/257; 264/319; 264/320; 264/324; 264/325; 264/328.1
(58) Field of Search .......................... 524/494; 264/241, 264/257, 319, 320, 324, 325, 328.1

(56) References Cited

U.S. PATENT DOCUMENTS 4,123,488 A  10/1978  Lawson
5,927,778 A  7/1999  Uytterhaeghe et al.
6,231,094 B1  5/2001  Uytterhaeghe et al.

FOREIGN PATENT DOCUMENTS

FR  2 763 547 A  11/1998

*Primary Examiner*—Edward J. Cain
(74) *Attorney, Agent, or Firm*—Oliff & Berridge, PLC

(57) ABSTRACT

The invention provides a method of manufacturing a part out of reinforced plastics material, the method comprising the following steps:

superposing at least one sheet and at least one item of local reinforcement in a mold before the mold is closed, at least one of the sheet and the local reinforcement being constituted by reinforcing fibers and thermoplastic material, the mold having a setback adjacent to the local reinforcement and of width greater than the local reinforcement; and introducing thermoplastic material into the setback in such as a manner as to compact the local reinforcement and an underlying region of the sheet, the mold being shaped so as to compress the sheet on either side of the local reinforcement during closure of the mold.

14 Claims, 1 Drawing Sheet

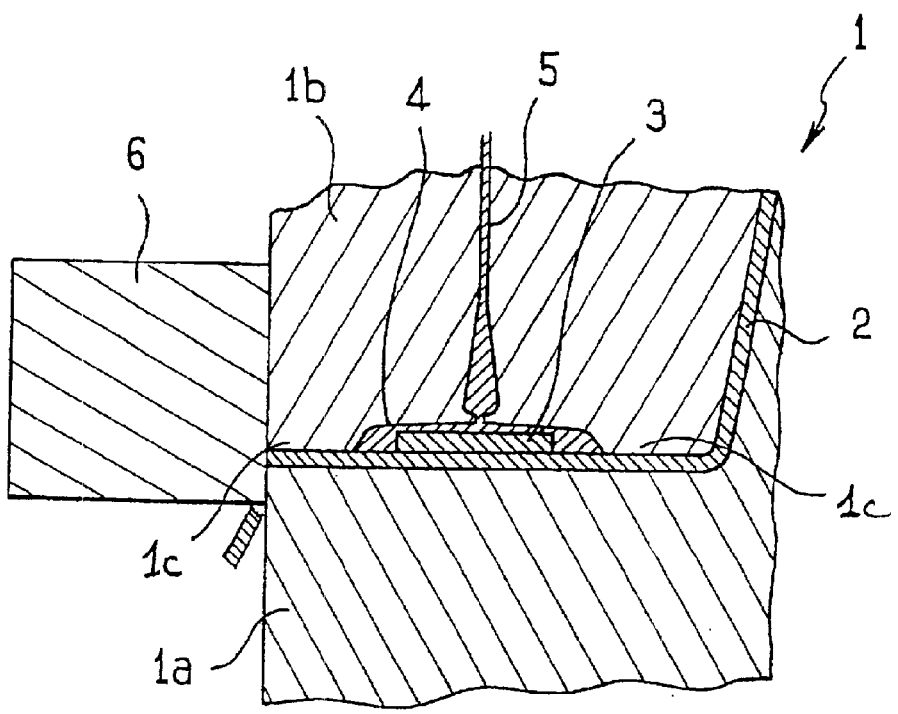
FIG_1

PART MADE OF REINFORCED PLASTICS MATERIAL, AND METHOD OF MANUFACTURE

The present invention relates to manufacturing parts out of reinforced plastics material, in particular structural parts for motor vehicles.

It is known for sheets of fibers impregnated in thermoplastic material, to be used in particular to make the bumper beams of motor vehicles.

By way of example, such sheets are known under the names TRE or TWINTEX.

TRE (Thermoplastique Renforcé Estampable [stampable reinforced thermoplastic]) is constituted by polypropylene reinforced with glass fibers.

TWINTEX (trademark registered by Vetrotex) is a fabric of yarns constituted by glass fibers embedded in polypropylene.

TEPEX (trademark registered by Du Pont de Nemours) is a drapable thermoplastic material having continuous fibers, like TWINTEX.

It is also known to use multilayer sheets obtained by superposing plies of TRE and plies of the TWINTEX or TEPEX type.

Such sheets need to be heated in order to be shaped.

International patent application WO 98/52793 discloses a method of manufacturing structural parts in which a sheet comprising reinforcing fibers impregnated in thermoplastic material are initially placed in an open mold, after which the mold is closed, and thermoplastic material is injected into the mold under pressure.

There exists a need to integrate local reinforcement into such a structural part, for example in order to improve the mechanical strength of certain zones.

In above-mentioned international application WO 98/52793, local reinforcement is held captive between two outer sheets, thereby complicating manufacture and making it necessary to use more than one sheet.

The present invention seeks to facilitate manufacturing a structural part out of one or more sheets comprising fibers impregnated in thermoplastic material, e.g. sheets of TWINTEX or any other similar material.

The invention achieves this by the fact that:
at least one sheet and local reinforcement are superposed in a mold before the mold is closed, with at least one of the sheet and the local reinforcement being constituted by reinforcing fibers and thermoplastic material, the mold having a setback beside the local reinforcement and of larger dimensions than the local reinforcement; and
thermoplastic material is then introduced into the setback so as to establish pressure therein serving to compact the local reinforcement and underlying region of the sheet, the mold being shaped so as to compress the sheet on either side of the local reinforcement during closure of the mold.

By means of the invention, it is relatively easy to put local reinforcement into place since there is no need for the or each piece of local reinforcement to be positioned very accurately in the mold.

In the invention, the above-mentioned setback is not intended to act directly to apply the pressure that is needed to compact the fibers of the local reinforcement and/or of the underlying region of the sheet, this pressure being obtained by means of the plastics material that is put into place prior to closing the mold in register with the setback or that is injected into the setback after the mold has been closed.

If, on the contrary, the pressure required for compacting has to be obtained directly by clamping the local reinforcement between the two mold portions on closure, then it would be necessary for the local reinforcement to be positioned very accurately, and that would lead to difficulties.

In a particular implementation of the invention, the sheet and/or the local reinforcement, and preferably both of them, are made of a fabric of yarn constituted by glass fibers and thermoplastic material, of the TWINTEX type.

The thermoplastic material is preferably introduced into the setback associated with the local reinforcement by pressure injection after the mold has been closed.

In a variant, the thermoplastic material is introduced into the setback before the mold is closed, and it is closure of the mold which produces the pressure required within the setback to compact the local reinforcement and the underlying sheet.

The depth of the setback is preferably slightly greater than the thickness of the local reinforcement.

Advantageously, the sheet is caused to project out from the mold, and after the mold has been closed, the portions of the sheet which project therefrom are then trimmed off.

Thus, the sheet can be positioned within the mold without too many constraints.

The invention also provides a reinforced plastics material part obtained by implementing the method as defined above.

The invention also provides a reinforced thermoplastic material part characterized by the fact that it comprises a non-plane sheet of a fabric of yarn constituted by reinforcing fibers and thermoplastic material, the sheet being locally lined with local reinforcement on which there is overmolded a mass of thermoplastic material that overflows slightly onto the sheet on either side of the local reinforcement.

Other characteristics and advantages of the present invention will appear on reading the following detailed description of a non-limiting implementation of the invention, and on examining the accompanying drawing in which FIG. 1 is a diagram showing a mold closed on a sheet supporting local reinforcement.

FIG. 1 shows a mold 1 having a bottom portion 1a and a top portion 1b that are movable relative to each other.

In the example described, the bottom portion 1a is stationary while the top portion 1b is movable vertically.

The mold 1 has a positive join plane, i.e. the moving portion 1b does not bear directly against the portion 1a during molding, thus making it possible to exert pressure on a sheet 2 disposed between the two portions of the mold, with the pressure applied to said sheet 2 being proportional to the downwardly directed thrust exerted by the top portion 1b.

In the embodiment described, the sheet 2 for being shaped by means of the mold 1 is a single sheet and it is constituted by a fabric of yarn constituted by glass fibers and thermoplastic material, of the TWINTEX type.

The sheet 2 serves as a support for at least one item of local reinforcement 3.

The top portion 1b has a setback 4 overlying the local reinforcement 3 and of width greater than that of the local reinforcement 3.

The depth of the setback 4 is greater than the thickness of the local reinforcement 3, as can be seen in FIG. 1.

The setback 4 is hollowed out in the inside face of the portion 1b of the mold between regions 1c for compressing the sheet on either side of the setback.

A channel 5 for injecting thermoplastic material is provided through the top portion 1b and opens out into the middle of the setback 4.

The channel 5 serves to inject thermoplastic material under pressure while in the fluid state into the setback 4 after the mold has been closed so as to compact the local reinforcement 3 and the underlying region of the sheet 2.

The thermoplastic material introduced into the setback 4 comes into contact with the reinforcement.

Outside the setback 4, the sheet 2 is compacted by the two portions 1a and 1b of the mold 1 clamping together.

The presence of the setback 4 which is wider than the local reinforcement 3 means that it is possible to accept a certain amount of tolerance on the positioning of the local reinforcement 3 relative to the sheet 2 without any danger of the local reinforcement 3 being compressed in non-uniform manner between the two portions 1a and 1b of the mold 1.

The mold 1 advantageously includes a cutting tool 6 which is lowered after the mold 1 has been closed so as to trim off any portions of the sheet 2 which project from the mold 1.

In order to make a non-plane structural part of open section, such as a bumper beam, the sheet 2 is placed on the bottom portion 1a with the local reinforcement 3 already in place, the mold is then closed by lowering the top portion 1b against the sheet 2, and thermoplastic material in the fluid state is injected under pressure via the injection channel 5 so as to fill the setback 4 and locally compact the local reinforcement 3 and the underlying region of sheet 2.

Once the compacting operation has been performed, the mold 1 is opened and after the part has cooled, it is extracted from the bottom portion 1a.

Naturally, the invention is not limited to the implementation described above.

In particular, instead of injecting the thermoplastic material in the fluid state under pressure via an injection channel, it is possible to deposit a suitable quantity of thermoplastic material above the local reinforcement by extrusion and then make use of the pressure generated by closing the mold in order to compact the local reinforcement 3.

It is also possible to place a plurality of items of local reinforcement 3 in a mold that is arranged accordingly.

What is claimed is:

1. A method of manufacturing a reinforced plastics material part, comprising:
    providing a mold having a setback with a width,
    providing at least one sheet and at least one local reinforcement insert, at least one of the sheet and the insert comprising reinforcing fibers and thermoplastic material, said insert having a width smaller than the width of the setback,
    superposing said at least one sheet and at least one insert in the mold before the mold is closed,
    closing the mold, said mold being configured such that during the closure of the mold, the mold compresses at least one first region of the sheet in the vicinity of the insert, and the insert is received in the setback,
    introducing a thermoplastic resin material into the setback such as to compact the insert and at least one second region of the sheet adjacent to the insert.

2. A method according to claim 1, wherein the compacting of the insert and of the second region of the sheet is performed by depositing a thermoplastic material in register with the setback and then closing the mold.

3. A method according to claim 1, wherein the sheet comprises glass fibers and thermoplastic material.

4. A method according to claim 1, wherein the insert comprises glass fibers and thermoplastic material.

5. A method according to claim 1, wherein the sheet and the insert comprise glass fibers and thermoplastic material.

6. A method according to claim 1, wherein said part is a bumper beam for a motor vehicle.

7. A method according to claim 1, wherein the thermoplastic material introduced into the setback comes into contact with the insert.

8. A method according to claim 1, comprising:
    providing a single sheet.

9. A method according to claim 1, wherein the part is a structural part of a motor vehicle.

10. A reinforced thermoplastic material part manufactured by the method according to claim 1.

11. A part made of reinforced thermoplastic material comprising a non-plane sheet comprising glass fibers and thermoplastic material, locally lined by at least one local reinforcement insert on which a mass of thermoplastic material is overmolded.

12. A method of manufacturing a reinforced plastics material part, comprising:
    providing a mold having a setback,
    providing at least one sheet and at least one local reinforcement insert, at least one of the sheet and the insert comprising reinforcing fibers and thermoplastic material,
    superposing said at least one sheet and at least one insert in the mold before the mold is closed,
    closing the mold, said mold being configured such that during the closure of the mold, the mold compresses at least one first region of the sheet in the vicinity of the insert, and the insert is received in the setback,
    injecting a thermoplastic material into the setback such as to compact the insert and at least one second region of the sheet adjacent to the insert.

13. A method of manufacturing a reinforced plastics material part, comprising:
    providing a mold having a setback,
    providing at least one sheet and at least one local reinforcement insert, at least one of the sheet and the insert comprising reinforcing fibers and thermoplastic material,
    superposing said at least one sheet and at least one insert in the mold before the mold is closed,
    closing the mold, said mold being configured such that during the closure of the mold, the mold compresses at least one first region of the sheet in the vicinity of the insert, and the insert is received in the setback,
    introducing a thermoplastic material into the setback such as to compact the insert and at least one second region of the sheet adjacent to the insert, said thermoplastic material coming into contact with the insert.

14. A method of manufacturing a reinforced plastics material part, comprising:
    providing a mold having a setback,
    providing at least one sheet and at least one local reinforcement insert, at least one of the sheet and the insert comprising reinforcing fibers and thermoplastic material,
    superposing said at least one sheet and at least one insert in the mold before the mold is closed,
    closing the mold, said mold being configured such that during the closure of the mold, the mold compresses at least one first region of the sheet in the vicinity of the insert, and the insert is received in the setback, said sheet having at least one portion that projects outside the mold,
    introducing a thermoplastic material into the setback such as to compact the insert and at least one second region of the sheet adjacent to the insert,
    trimming off said sheet portion projecting outside the mold after closing the mold.

* * * * *

UNITED STATES PATENT AND TRADEMARK OFFICE
CERTIFICATE OF CORRECTION

PATENT NO. : 6,800,686 B2 Page 1 of 1
DATED : October 5, 2004
INVENTOR(S) : Charles-Guillaume Blanchon It is certified that error appears in the above-identified patent and that said Letters Patent is hereby corrected as shown below:

Title page,
Insert Item -- [30]     Foreign Application Priority Data
            Mar. 20, 2000   (FR) ..................................... 00 03531 --

Signed and Sealed this

Fifteenth Day of February, 2005

JON W. DUDAS
*Director of the United States Patent and Trademark Office*